US010845492B2

(12) United States Patent
Degner et al.

(10) Patent No.: US 10,845,492 B2
(45) Date of Patent: Nov. 24, 2020

(54) AUTOMATED GEOPHYSICAL SENSOR DEPLOYMENT APPARATUS AND METHOD

(71) Applicant: Geophysical Technology, Inc., Bellaire, TX (US)

(72) Inventors: Richard A. Degner, Bellaire, TX (US); Gary L. Scott, Missouri City, TX (US)

(73) Assignee: Geophysical Technology, Inc., Bellaire, TX (US)

( * ) Notice: Subject to any disclaimer, the term of this patent is extended or adjusted under 35 U.S.C. 154(b) by 261 days.

(21) Appl. No.: 15/951,012

(22) Filed: Apr. 11, 2018

(65) Prior Publication Data

US 2018/0231675 A1 Aug. 16, 2018

Related U.S. Application Data

(63) Continuation of application No. PCT/US2016/057294, filed on Oct. 17, 2016.

(60) Provisional application No. 62/243,108, filed on Oct. 18, 2015, provisional application No. 62/243,050, filed on Oct. 17, 2015.

(51) Int. Cl.
*G01V 1/16* (2006.01)
(52) U.S. Cl.
CPC .............. *G01V 1/166* (2013.01); *G01V 1/168* (2013.01)
(58) Field of Classification Search
CPC .................................. G01V 1/166; G01V 1/168
See application file for complete search history.

(56) References Cited

U.S. PATENT DOCUMENTS

| 3,242,741 | A | 3/1966 | Gamer |
| 5,315,074 | A | 5/1994 | Berquist |
| 5,811,741 | A | 9/1998 | Coast et al. |
| 6,316,062 | B1 | 11/2001 | Alft et al. |
| 6,814,160 | B1 | 11/2004 | Scott |
| 7,289,871 | B2 | 10/2007 | Williams |
| 8,122,974 | B2 | 2/2012 | Kosoric |
| 2015/0160356 | A1 | 6/2015 | Friedly et al. |
| 2018/0231675 | A1* | 8/2018 | Degner .................. G01V 1/168 |

FOREIGN PATENT DOCUMENTS

| WO | 2016073720 A1 | 5/2016 | |
| WO | WO-2017066738 A1 * | 4/2017 | ............. G01V 1/168 |

OTHER PUBLICATIONS

International Search Report and Written Opinion, International Application No. PCT/US2016/057294 dated Jan. 26, 2017.

* cited by examiner

*Primary Examiner* — Daniel Pihulic
(74) *Attorney, Agent, or Firm* — Richard A. Fagin

(57) ABSTRACT

A geophysical sensor deployment apparatus designed to provide improved coupling between the sensor and the ground, includes a ram extendible through a ram guide. The guide has an opening for insertion of a geophysical sensor. The ram has a ground displacing bit at a movable end thereof. The ram and the guide are mounted to a frame. The mounting has a pivot and a plurality of angularly separated extension mechanisms disposed between the ram and guide and the frame whereby an elevation and an orientation of the ram and the guide are controllable by selective extension of each of the plurality of extension mechanisms.

11 Claims, 9 Drawing Sheets

AUTOMATED GEOPHYSICAL SENSOR DEPLOYMENT APPARATUS AND METHOD

CROSS REFERENCE TO RELATED APPLICATIONS

Continuation of International Application No. PCT/US2016/057294 filed on Oct. 17, 2016. Priority is claimed from U.S. Provisional Application No. 62/243,108 filed on Oct. 18, 2015 and U.S. Provisional Application No. 62/243,050 filed on Oct. 17, 2015, both of which are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure is related to the field of geophysical sensing devices such as seismic sensors (e.g., geophones, hydrophones, accelerometers and/or sensors that may be located within autonomously operated sensor recording devices ("nodes") deployed in the soil proximate the ground surface for sensing physical parameters of geologic formations in the subsurface. More specifically, the disclosure relates to devices for deploying geophysical sensors or sensor nodes in the ground automatically, or manually.

Geophysical sensors are known in the art to be deployed in the ground above an area of the subsurface for which geophysical parameter measurements are to be made. Such parameter measurements include seismic signals, both sub-surface originating and controlled source, surface reflection seismic signals, for example. Seismic sensors known in the art may include a sensor such as a geophone or accelerometer, multiple component geophones or accelerometers to measure the seismic energy waves found in the earth surface ground motions and/or hydrophones for measuring pressure wave form of seismic energy originating in or reflected from acoustic impedance boundaries in the subsurface. Seismic sensors of the foregoing types may be wired together in multiple sensor "strings" or arrays, disposed in individual housings each having a spike or other ground contract device and pressed into the soil near the surface to make acoustic contact with the ground, in an attempt to couple the sensor solidly to the ground, so to translate the ground motion to the motion sensor's transducer element. In some implementations, a small hole may be dug, pressed, or drilled to position the seismic sensor below layers of loosely consolidated soil, out of the air's motion, and the airborne sound waves to improve acoustic coupling between the sensor and the ground.

More recently, seismic and other geophysical sensors have been combined with autonomous recording nodes and/or wireless communication devices in individual housings. Some of such autonomous sensing and recording devices may be deployed in the ground by drilling, pressing, or digging a hole to accommodate the housing, disposing the housing in the hole and in some cases covering the hole with the deployed housing therein. Manual deployment of such autonomous sensors and recording devices may be time consuming and labor intensive.

DETAILED DESCRIPTION

Figure 1:
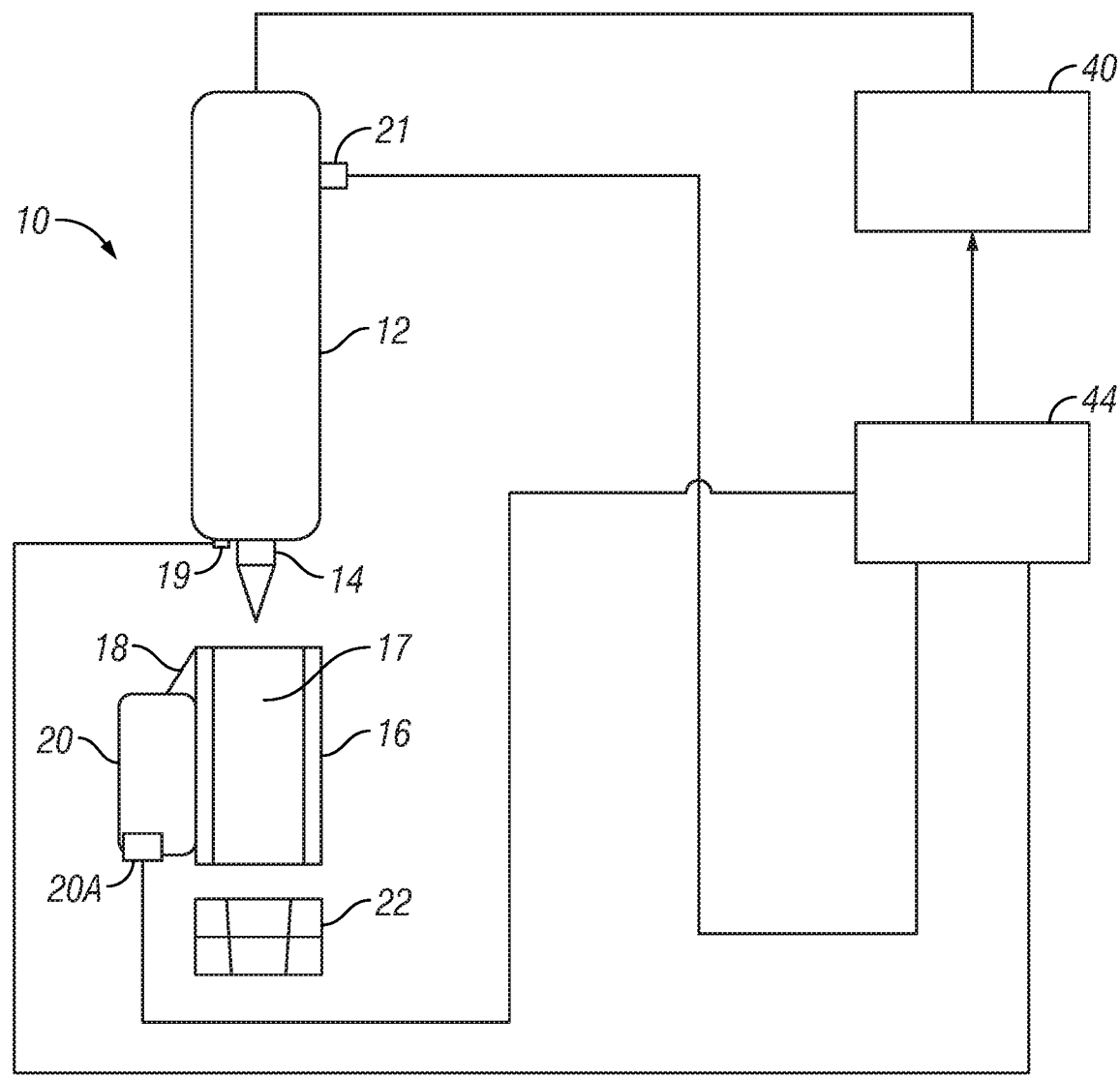
FIG. 1 shows an example automatic sensor deployment apparatus that may be mounted on a vehicle or other transport device.

An example apparatus for automatically deploying geophysical sensors or sensor nodes in the ground is shown schematically in FIG. 1. The deployment apparatus 10 may be mounted to any type of vehicle (see 30 in FIGS. 2 and 3) suited for movement along the particular ground surface where geophysical sensors or nodes are to be implanted into the ground surface. The type of vehicle may be selected to suit the particular surface features of the ground surface where the geophysical sensors are to be deployed, e.g., a track drive vehicle for soft sand or mud, or rubber tire drive vehicles for more level, firm ground surfaces. The type of vehicle used in any particular embodiment is not intended to limit the scope of the present disclosure.

Sensors and/or sensor nodes (see 46 FIG. 4) may be stored in the vehicle in a manner such that individual sensors or sensor nodes may be retrieved from the storage in the vehicle and moved to the deployment apparatus 10 for deployment in the ground surface, for example, one at a time as will be further explained below. Non limiting examples of sensor nodes may include sensor nodes sold under the trademarks NRU 1C and NRU 3C, both of which are trademarks of Geophysical Technology, Inc., Bellaire, Tex. Other examples of sensor nodes may include, without limitation, devices such as described in U.S. Pat. No. 8,614,928 issued to Kooper et al. and U.S. Pat. No. 8,611,191 issued to Ray et al. Examples of individual sensors that may be deployed using an apparatus according to the present disclosure may be, for example and without limitation, ones such as shown in U.S. Pat. No. 8,238,197 issued to Crice et al.

Figure 2:
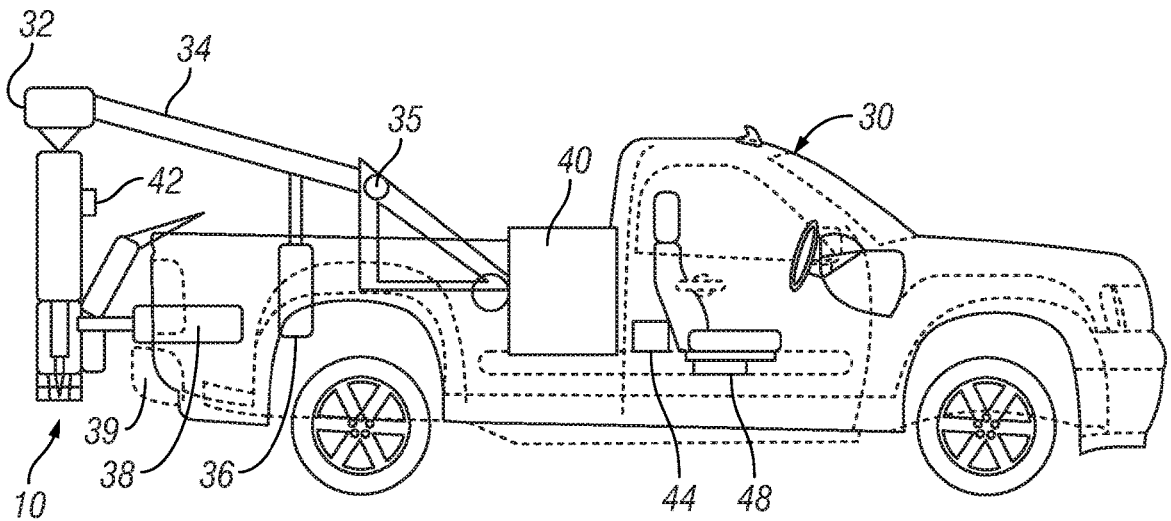
FIG. 2 shows a side, cutaway view of an example vehicle including a deployment apparatus according to one aspect.
Figure 3:
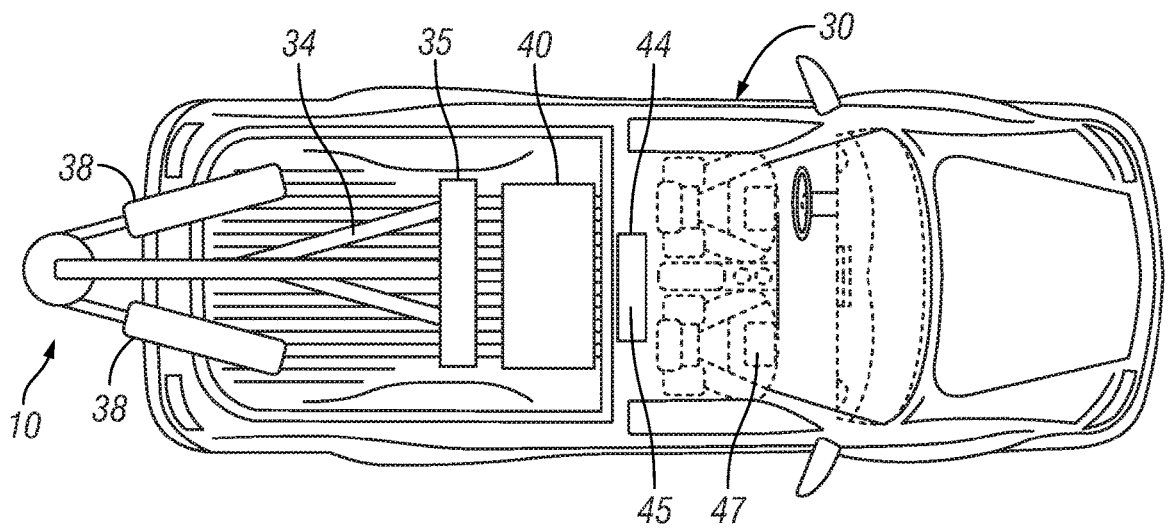
FIG. 3 shows a top view of the vehicle and deployment apparatus of FIG. 2.
Figure 10:
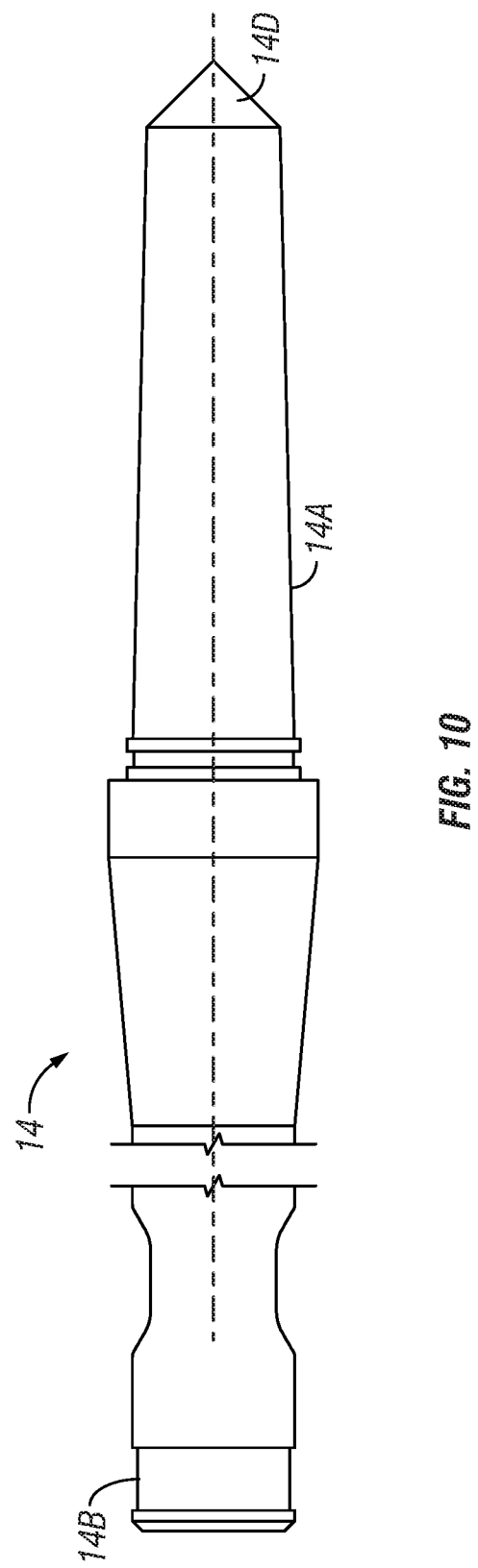
FIG. 10 shows an example profile of a ground penetrating spike or bit.

The deployment apparatus 10 may include a controllable ram 12, which may be, for example a hydraulic ram, an electric motor powered ram or a manually operated hammering tool with a ram bit. The diameter of the ram 12 may range from 0.025 inches to 3 inches in some embodiments. The stroke length of the ram 12 for purposes of this description may be defined as the difference between the distance of the tip of the fully retracted ram 12 to a fixed reference to the distance with the ram 12 fully extended. To achieve sufficient ground penetration, this distance may be between 6 and 36 inches in some embodiments. A fixed part of the ram 12 (i.e., the ram cylinder in an hydraulic ram) may be mounted to the vehicle (FIGS. 2 and 3). A lower end of the ram 12, that is, the movable part, may include a ground-penetrating bit or spike 14 mounted thereon. The bit or spike 14 may be shaped to displace the soil, rather than removing soil when the ram 12 is extended so as to create a hole for insertion of a sensor or sensor node therein. The ram 12 may also be configured or powered such that rotation of the bit or spike 14 takes place during hole creation or while being removed from the formed hole. FIG. 10 shows an example profile of a spike or bit 14 according to the present disclosure. The spike or bit 14 may comprise a ground penetrating tip 14D, tapered for example, at a 45 degree angle or similar angle to avoid having the tip 14D be excessive length. A hole creating profile section 14A of the bit 14 may have substantially a same shape (e.g., taper angle) as an exterior surface of a ground penetrating part of a sensor or sensor node (see FIG. 8), however the diameter of the bit 14 is smaller, for example 5 percent smaller than the diameter at any corresponding axial (longitudinal) position along the exterior of the hole creating profile section 14A.

The spike or bit 14 may include a connector 14B to couple the spike to the ram (12 in FIG. 1). The connection may be, for example, threads having a direction opposite to a direction in which the ram (12 in FIG. 1) is rotated during extension of the ram. For example, if the ram rotates counterclockwise looking from above the ram, the connector 14B may have left handed threads and vice versa.

Figure 4:
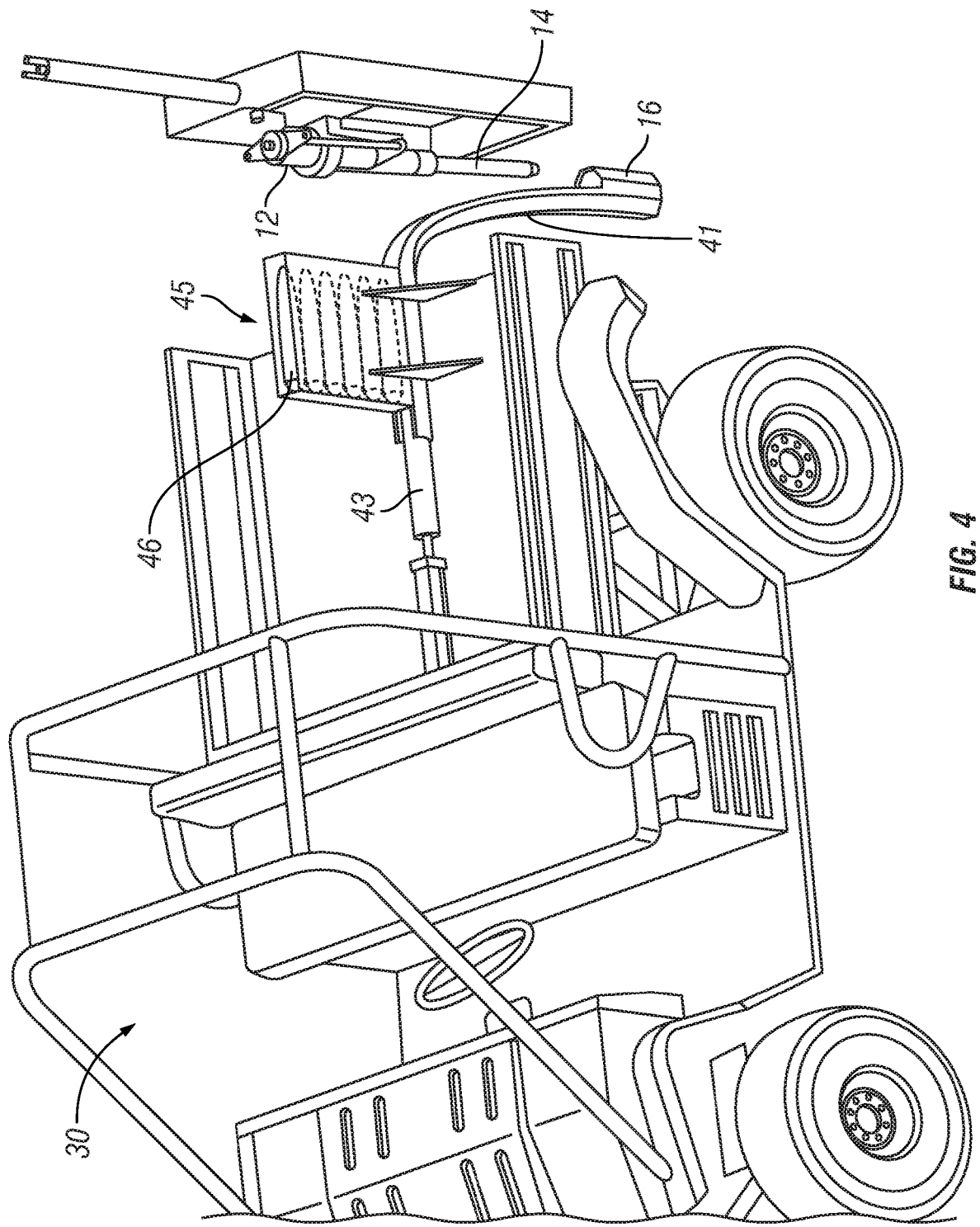
FIG. 4 shows another example embodiment of a deployment apparatus.

Returning to FIG. 1, a powered deployment system may provide enhanced ground coupling of a sensor or sensor node through particular ground preparation during creation of a hole for insertion therein of a sensor or sensor node (46 in FIG. 4). The ground may be prepared by inserting into the ground a bit or spike 14 having a predetermined shape and dimensions. In some embodiments, the shape of the bit or spike 14 may be substantially the same as the shape of the ground contact portion of the sensor or sensor node but having selected reduced dimensions with respect to the dimensions of the ground contact portion of the sensor or node housing.

The action of the spike or bit 14 is such that the hole created by ground insertion thereof is slightly smaller in dimension than the node or sensor housing, and creates movement of the ground material around the hole outwardly, so to create a hole with compressed ground material around it. The ground material is then of higher density immediately around the hole, and by such compression the ground material will to some extent rebound. The rebound and selected diameter/profile (see FIG. 10) may provide a compression coupling between the interior surface of the hole and the sensor or node housing (see 46A in FIG. 8). Such fit provides the necessary degree of coupling between the ground and the housing to create a path for the traveling acoustic pressure waves in the ground to pass into the sensor housing and into the sensor (whether just as a sensor or as part of a sensor node).

Matching spike or bit 14 size, shape, and insertion while rotating, and rotating during the extraction processes to create a hole that is shaped as the node sensor housing but undersized and has a hole wall that is smoothed, with substantially no cracking or material disruption other than increased compression. The pressing of the sensor housing (FIG. 8), during the insertion process, further expands the hole, and increases the pressure of the ground material against the sensor housing, and increasing acoustic coupling.

The hole generation process creates a hole and surrounding ground material that is compressed into a higher density, with a density profile that is maximum at the internal wall of the hole and tapers back to ambient away from the hole. This ground profile is created unstable by this process. Unstable in that the ground material will be pressurized and forced to return back into the hole to relieve the pressure of the increased density. This action causes the ground material to spring back, collapsing against the inserted sensor housing.

Returning to FIG. 1, power to operate the ram 12 may be provided by an hydraulic pump 40 if the ram is hydraulic. In other embodiments, the ram 12 may be, for example driven by a jackscrew rotated by a motor and a ball nut coupled to the bit or spike 14. In another embodiment, the ram 12 may comprise a sled that translates along an axis derived from alignment to the gravitational field of the Earth. The sled remains at a fixed distance from the chamber unit assembly 16.

Figure 5:
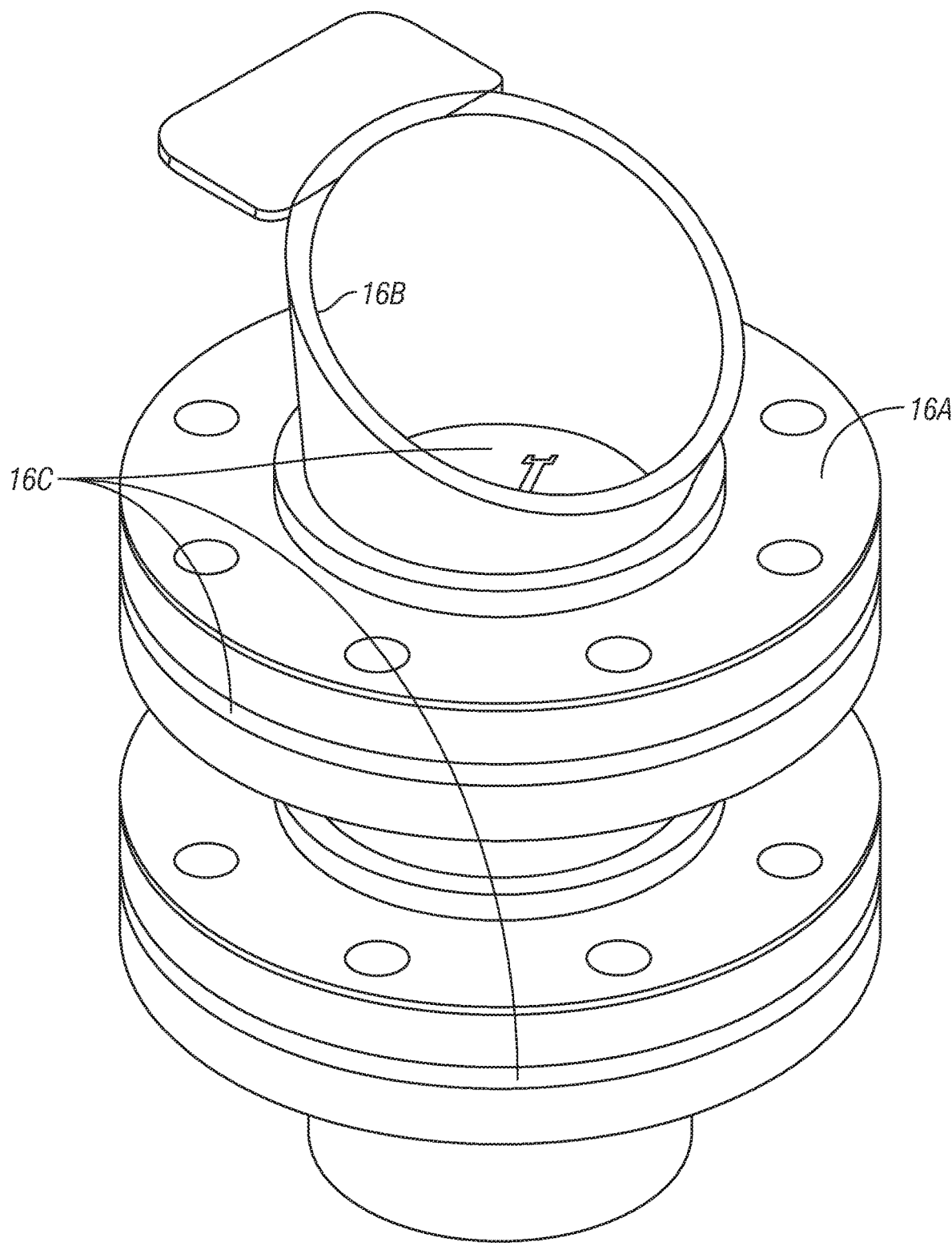
FIG. 5 shows an example embodiment of an insert for a staging unit.

A chamber unit assembly (a ram guide) 16 may be disposed axially below the bit or spike 14 to guide the bit or spike 14. When the ram 12 is retracted, the bit or spike 14 may be positioned directly above a corresponding through bore 17 in the chamber unit assembly 16 that may assist in guiding the bit or spike 14 as the ram 12 is extended. In one example embodiment, the chamber unit assembly 16 (see FIG. 5) comprises a fitting that includes a flange 16A with and internal cylinder 16B. The diameter of the internal cylinder 16B may be between 2.5 and 5.5 inches. The internal diameter of the cylinder 16B should be approximately the same as the external diameter of the sensor or sensor node. The inner diameter of the cylinder 16B should provide an opening that allows a free range of 0.25 to 0.75 inches of movement from the inner diameter and the external diameter of the sensor or sensor node. Two flanges 16A may align along a common diameter that is approximately the same as the outer diameter of the cylinder 16B. The outer diameter of the flange 16A may be between 6 and 9 inches. A silicone grommet or inflatable, adjustable pneumatic ring 16C that serves to collect the sensor or node may be disposed or constrained between adjacent flanges 16A and provides passage for the ram 12 and bit 14. A second set of flanges 16A having there between a corresponding silicone grommet 16C may be disposed between 3 and 6 inches from the center of the first grommet 16C. This arrangement provides the ability to align the ram 12 and the bit 14 along a center axis, while also providing for a "soft" stop for a sensor or node as it is disposed in the chamber unit assembly 16.

An example of the operation of the chamber unit assembly 16 may be described as follows. The sled comprising the hydraulic unit with the ram and bit ram remain at a fixed distance from each other. When the sled moves toward the ground, the chamber unit assembly 16 serves as a stop to the ground. Once the system detects the chamber unit 16 has touched the ground, the ram 12 is deployed by the extension of the hydraulic cylinder, and the bit 14 translates through chamber unit assembly 16, such that it is inserted into the ground commensurate with length of the sensor to be deployed. As the ram is returned to the cylinder, chamber unit 16 stays on the ground until a sensor or node is deposited into the silicone grommets 16C. At this time the bit or purpose-built node planting sleeve returns to push the sensor or node into the ground using a low power mode.

Returning to FIG. 1, in some embodiments, the ram 12 may be operated in at least two different power modes, wherein hydraulic power to operate the ram is supplied by a hydraulic pump 40 controlled by a control unit 44 such as a microprocessor, programmable logic controller or any similar process control device. The control unit 44 may be in signal communication with a linear position sensor 19 and a pressure transducer 21. The power mode may be controlled, for example by controlling hydraulic fluid pressure and flow rate. A high power mode may be enabled by operating the hydraulic pump 40 at a selected measured flow rate and measured pressure. One skilled in the art will understand that the control unit 44 may be adjusted or programmed to account for the type of ground condition by selecting time, pressure or flow rate thresholds appropriate to the type of ground. An example of a hydraulic power pack that may be used in some embodiments is commercially available from Hydra-Tech Pumps 167 Stock Street, Nesquehoning, Pa. 18240, such as model HT6DE. The foregoing pump can sustain a maximum flow of 4.5 gallons per minute with a maximum pressure of 1800 pounds per square inch (psi). The pump 40 and the ram 12 may be used for pressing the bit or spike 14 directly into the ground to create a hole for subsequently implanting a sensor or sensor node therein (FIG. 4). A low power mode similarly may be obtained by suitable control of fluid pressure and flow rate. The low power mode may be used to safely press-fit the sensor or sensor node (FIG. 4) into the previously prepared hole in the ground created by the bit or spike 14 when the ram 12 was operated in the high power mode. The ram 12 will then be retracted back out of the ground, passing up and through the chamber unit 16 back into its resting position above the chamber unit 16. The position sensor 19, which may be for example, a linear variable differential transformer may be provided to measure the length of the ram's 12 displacement so as not to force the sensor or sensor node into the ground more than desired. In another embodiment, the control unit 44 may be programmed to respond to measurements from the position sensor 19 to a predetermined ram 12 displacement with an arbitrary zero setting. In one embodiment, the control unit 44 is programmed such that a positive displacement or extension of the ram is equal to a measured ram extension of zero, or ground level. The pressure transducer, 21 may also be provided to measure the fluid pressure and thus the corresponding force exerted by the ram 12 to avoid applying excessive force to the sensor or sensor node in the low power mode.

Figure 11:
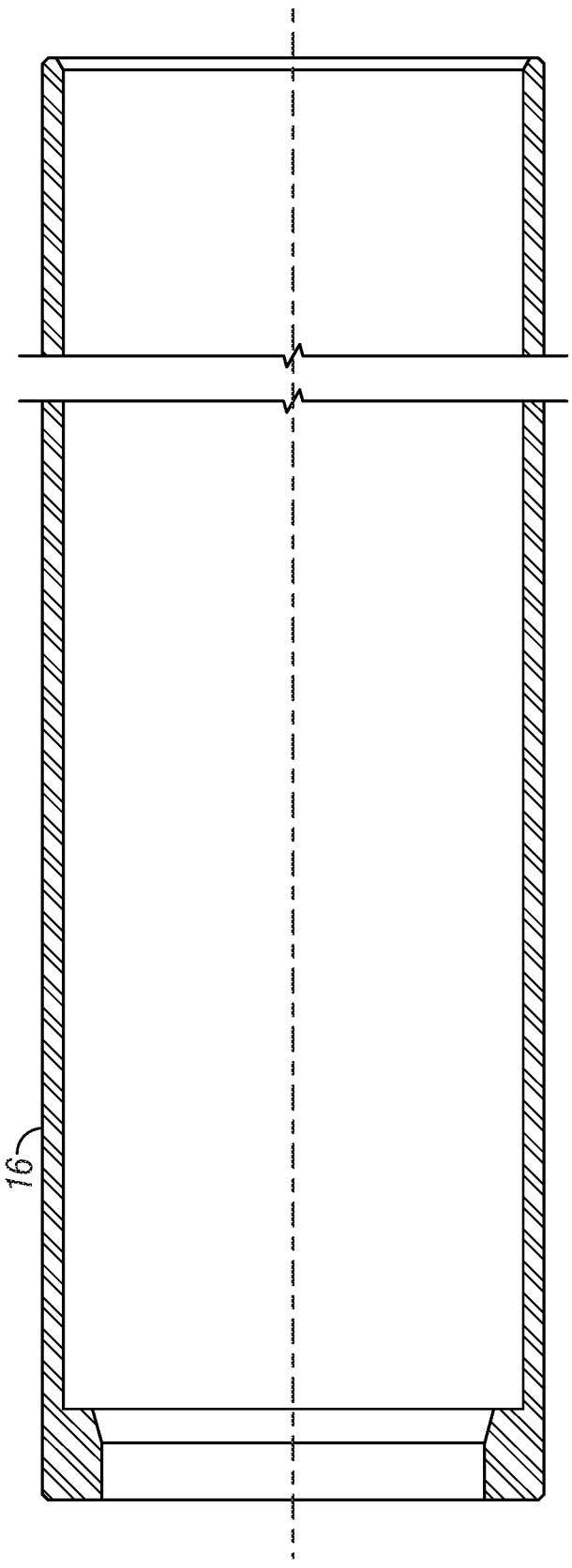
FIG. 11 shows an expanded view of a ram guide.

The chamber unit assembly 16 may be provided with an opening (loading entrance) 18 axially displaced from the longitudinal axis of the ram 12 wherein a sensor or sensor node can be passed through by a loading mechanism. An example embodiment loading mechanism may comprise a crate with a latch, chute and collar. An example embodiment of a loading system will be explained below with reference to FIG. 4. With the control unit 44 actuated, the loading system is selectively activated to release a sensor or node only in the event a hole in the ground surface has been successfully prepared, and the ram 12 has been returned to the retracted position. Thus in the event of a failure to create a sufficiently deep deployment hole, the control unit 44 operates the ram 12 to return to the retracted position. The ram 12 may be automatically or manually reactivated depending upon the programming for the control unit 44 chosen by the user. In one example embodiment, a spring loaded release pin or trigger curved plate, in a vertical position, and the chamber unit assembly 16 will accept and hold the sensor or sensor node that is passed into the chamber unit through bore 17. An example of such a mechanism may be similar in configuration as a spring loaded ammunition clip secured to a firing chamber of a pistol or rifle. In other embodiments, the sensor or sensor node may enter through a tube forming a "Y" merging with the path of the ram 12 just above the chamber unit assembly 16. One such embodiment will be further explained below with reference to FIG. 4. A more detailed view of the guide part of the chamber unit assembly is shown in FIG. 11.

The system may monitor and record and display (FIG. 4) for the operator, the geodetic position of the latest sensor or node deployment, the axial orientation of the sensor or node with respect to vertical, the depth to which the node or sensor is deployed and the pressure used when inserting the sensor or node into the ground.

The chamber unit through bore 17 may, for example, have one or more D shaped springs (not shown) around the sides on a staging unit door 20, to hold the sensor or sensor node in place and vertically when the staging unit door 20 is closed. The staging unit door 20 may also have a D-shaped spring on it. In some embodiments, the chamber through bore 17 comprises sandwiched disks with diameter between 0.125 and 3 inches greater than the diameter of the sensor or node's widest point. In the top disk, or flange, see FIG. 5, an elastomer with an opening that catches the sensor node, but for which is it easily released is described. Example elastomers include natural rubber, butyl rubber, Viton, nitrile butyl rubber and silicone rubber. Another example embodiment may use an adjustable pneumatic inflatable tube to receiver and hold the sensor node until planted into the condition hole via the actuation of the bit or spike 14.

In some embodiments, it may be desirable to disable the deployment of a subsequent sensor or node through the use of a mechanical system that comprises the staging unit door 20. The staging unit door 20 may comprise a sensor 20A in signal communication with the control unit 44. When the staging unit door 20 is closed, the control unit 44 receives a signal from the sensor 20A indicative of the staging unit door 20 position, and in such case inhibits deployment or advancement of any additional sensor or node. In one example, the staging unit door 20 includes a hinged fastener to the chamber unit assembly 16. When the staging unit door 20 is open, the control unit 44 receives a signal from the sensor 20A that the staging unit door 20 is open, and may operate the loading mechanism 18 such that a node or sensor can be advanced into the through bore 17. Such control may be enabled by the control unit 44 that locks sensor or node advancement when the door 20 is closed and unlocks sensor or node advancement when the door 20 is open. In an example embodiment, sensor or node deployment may be managed by the control system, e.g., as shown at 44, providing for a simplified mechanical design without the use of a staging unit door. In this example embodiment, the control unit 44 may be programmed to stop advancement of any node or sensor into the through bore 17 in the absence of a successful hole creation. Absence of a successful hole creation may be determined in the control unit 44 by examining recorded measurements of the linear position sensor 19 during a hole opening operation. A measurement of linear position indicative of failure of the ram 12 to extend to a distance corresponding to a fully opened hole may result in the control unit 44 stopping advance of a sensor or node into the through bore 17 until which time as a successful hole creation is measured and recorded by the control unit 44.

When a merging process (guide chute or tubes) is used the sensor or node will be allowed to drop or slide down into the chamber unit assembly 16 below the resting position of the ram 12. The D springs or other biasing devices, such as the sandwiched flanges (16C in FIG. 5) disposed around the interior wall of the chamber unit 16 may allow the sensor or node to drop into such location a selected amount and then be halted by friction between the D springs or other biasing device and the sensor or node. The sensor or node is thus held in a selected orientation and may be guided by the chamber through bore 17 as it is pushed through the chamber unit assembly 16 and into the previously created hole.

The chamber unit assembly 16 when closed will then allow the bit or spike 14, pushed by the ram 12, to pass, top to bottom through the chamber unit assembly 16, and push a sensor or sensor node loaded into the chamber unit through bore 17 through the chamber unit assembly 16, out the bottom and into the prior pressed hole in the ground surface.

The chamber unit assembly 16, along with a caged lower unit 22, may guide the sensor or sensor node as it is pushed out of the chamber unit 16 and into the pilot hole.

Figure 9:
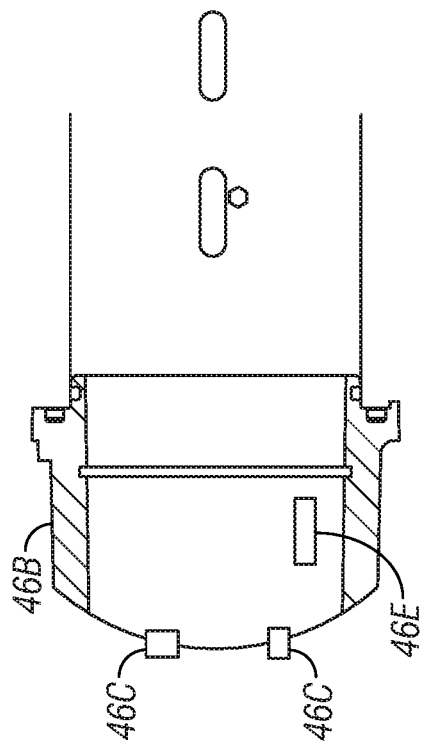
FIG. 9 shows an example cap for a sensor or sensor node.
Figure 8:
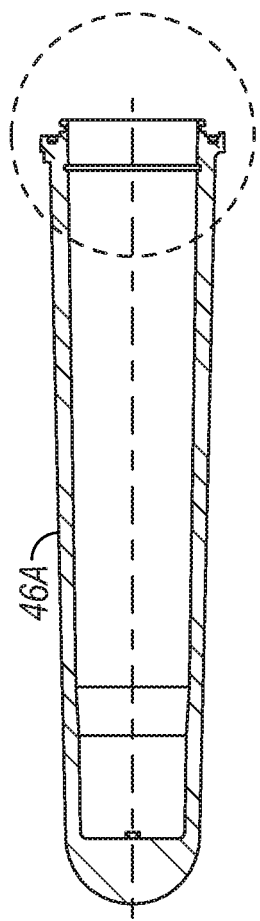
FIG. 8 shows an example housing profile for a sensor or sensor node.

A cap affixed to the upper end of each sensor or sensor node may also contain a wireless transceiver to perform instrument tests on the sensor or sensor node prior to being inserted into the ground. The cap may move with the sensor or sensor node and then return to the top where it swings out of the way for the ram to pass through when next commanded. An example of the foregoing communication system in a cap is described in U.S. Patent Application Publication No. 2011/0141850 filed by Scott et al., incorporated herein by reference in its entirety. Referring to FIG. 8, an example embodiment of the ground penetrating part 46A of the sensor or node housing is shown in cross section, wherein may be observed a taper that corresponds to the taper on the spike or bit (see FIG. 10). FIG. 9 shows an example of the cap 46B coupled to the top of the ground penetrating part (FIG. 8). The cap 46B may comprise electrical contacts 46C for battery charging and/or signal communication and one or more antennas 46E for signal communication, for example and without limitation GPS receiving, data transfer and wireless battery charging.

Returning to FIG. 1, the caged spacing unit 22 may be attached to the bottom of the chamber unit assembly 16 to keep the chamber unit assembly 16 elevated from the ground surface by a selected distance, for example about three to four inches (80 to 130 mm) to help keep the chamber unit assembly 16 clean and free of obstructions caused by lifting soil when the ram 12 is retracted.

The bottom of the caged spacing unit 22 may be formed into a circular opening that the bit 14 and sensor or sensor node can pass through. The caged spacing unit's 22 bottom presses on the ground, keeping the ground from pulling up when the ram is retracted out of the hole formed by the bit 14 when the ram 12 is operated to form a node or sensor hole. The caged spacing unit 22 may also be fitted to be able to be rotated on command to clear away and grass and small vegetation proximate the hole, so air movements will not allow such vegetation to sway and strike the sensor or node so as to create an acoustic vibration or noise in the sensor or node.

A side mounted staging assembly unit (opening 18, door 20), may be attached to the side of the chamber unit assembly 16 at the side opening described above. The staging assembly unit (18, 20) may perform the following:

a) accept sensors or sensor nodes (either one at a time by hand, or a succession of the sensors or nodes conducted to the staging assembly unit (opening 18, door 20) by a conveyor system from a sensor or sensor node storage bin into the staging assembly unit. The sensor or sensor node is held in the staging assembly unit until the chamber unit 16 door is opened, allowing the sensor or sensor node to be loaded into the chamber unit 16. While a sensor or sensor node is in the staging assembly unit other sensors or nodes are excluded from entering the staging assembly unit. In embodiments having a "Y" shaped entry for the sensor or nodes a feeding mechanism may supply sensors or sensor nodes one at a time, and on command.

b) when the chamber unit door opens, the sensor or sensor node then in the staging unit is loaded into the chamber unit, the chamber unit door then closes and the conveyor system will then allow another sensor or node to enter the staging unit and be staged.

c) the staging unit and the conveyor system may be designed to allow for the attachment of a fully automated loading assembly, with a "bin" or "hopper" that holds a selected number of sensors or nodes, to be automatically placed in the automated loading assembly.

The deployment apparatus 10 may also have powered movement (that may operate manually or be automated) to position the deployment apparatus 10 in a vertical orientation for creation of the hole and deployment of the sensor or node, regardless of the terrain attitude.

FIGS. 2 and 3 show, respectively, a side cutaway view and a top view of an example vehicle 30 that may be used in some embodiments with the deployment apparatus 10 explained above. The vehicle may include a frame 34 mounted to the vehicle 30. The frame 34 may support the deployment apparatus 10. In the present example, the deployment apparatus 10 may be suspended at its upper end from a spherical joint swivel 32 at one end of an arm 33. The other end of the arm 33 may be coupled by a pivot 35 to the frame 34 to enable the arm 33 to be raised for vehicle movement and lowered for using the deployment apparatus 10. The deployment apparatus 10 may be coupled to two, angularly separated extension mechanisms 38. Each extension mechanism 38 may be, for example an hydraulic cylinder and ram as shown in FIG. 3. In other embodiments, the extension mechanisms 38 may each be, for example, a worm gear rotated by an electric or hydraulic motor (not shown in the figures). The arm 33 may be coupled at a position intermediate its two ends to a lifting mechanism 36, which in the present embodiment may be an hydraulic cylinder and ram. Operating pressure for the hydraulic cylinders (including, e.g., the ram 12 in FIG. 1) may be provided by an hydraulic pump 40 of any type known in the art.

The deployment apparatus 10 may include a tilt sensor 42 thereon. The tilt sensor 42 may be any type known in the art, for example, an electrolytic bubble level sensor or a multiple axis accelerometer. The tilt sensor 42 may be in signal communication with a control unit 44. The control unit 44 may include a computer processor, such as a microcomputer, microcontroller, programmable logic controller, floating programmable gate array and the like. The control unit 44 may accept as input signals from the tilt sensor 42 and send control signals to the extension mechanisms 38 and the lifting mechanism 36 to automatically move the arm to the correct position for operation of the deployment mechanism 10 and to cause the deployment mechanism 10 to be in a substantially vertical orientation. Vertical orientation is only an example; any other selected orientation is within the scope of the present disclosure.

The control unit 44 may include a geodetic position signal receiver 44A, such as a Global Navigation Satellite System (GNSS) receiver. The geodetic position signal receiver 44A may communicate the geodetic position of the vehicle 30, and correspondingly, the position of the deployment apparatus 10 so that the geodetic position of each deployed sensor or sensor node (FIG. 4) may be measured and recorded. In some embodiments, the geodetic position signal may be used to automatically and/or remotely operate the vehicle 30 such that each sensor or sensor node may be positioned at a predetermined geodetic position and/or in a preselected pattern or array.

The control unit 44 may be in signal communication with a display 47. The display 47 may provide a camera view, e.g., from a camera such as shown at 39 in FIG. 3, of the deployment apparatus 10, as well as a measured geodetic location at which a given sensor or sensor node is to be deployed. In one such example, commercially available devices from Trimble Navigation Limited, 935 Stewart Drive, Sunnyvale, Calif. 94085 may be used to provide geodetic location and navigation services for the node deployment system, including the deployment apparatus 10 and the vehicle 30. The sensors or sensor nodes may be arranged in an array designed to a specific job goal, as will be recognized by one skilled in the art. In one embodiment, an operator may use the geodetic positions presented on the display 47 to find each subsequent geodetic location at which to deploy a sensor or sensor node. In some embodiments, the vehicle 30 may be controlled and driven remotely or automatically using steering controls in signal communication with the control unit 44.

Each sensor or sensor node may comprise an integrated unit that includes a plurality of sensors that measure, e.g., compressional waves and/or shear waves moving through formations below the sensor or sensor node. Seismic sensors known in the art detect shear and compression waves as a result of directed geological disturbances such as an explosions or force generating devices such as air guns or seismic vibrators. A seismic wireless sensor node may measure and record 1-dimensional (1D) to 3-dimensional (3D) directional waves as measured by particle motion responsive sensors such as geophones or accelerometers and may in addition measure pressure or pressure time gradient using sensors or nodes deployed in water using hydrophones or similar seismic sensors or rotational sensors. Thus the sensor or sensor node detects mechanical energy and converts it to an electrical or optical signal. If the sensor(s) are part of a sensor node, the detected signals may then be recorded in a temporary storage device, for example a solid state mass data storage device forming part of the sensor node. Power for the sensor node may be provided by, for example and without limitation, lithium ion batteries. Retrieving recorded data from the temporary storage device may be provided by a processor that controls wireless communication through TransferJet™ signal communication systems. TransferJet is a trademark of Toshiba Corporation, 1-1, Shibaura 1-chome, Minato-ku, Tokyo 105-8001, Japan. TransferJet signal communication may be embodied as a wireless integrated circuit that provides capacity to transfer data between devices at practical rates up to 350 MB/sec (500 MB/sec theoretical maximum) when two devices are proximate each other, typically several centimeters. Another circuit system in the sensor node controls charging and control of status indicators such as LED indicator lights. An internal clock in each sensor or node synchronizes with absolute time reference signals such as global positioning satellite (GPS) signals, which may be detected by a suitable receiver disposed in the sensor node. In another sensor node system option, electrical power in the sensor node is controlled to only be active during recording of seismic data; such time(s) and may be pre-programmed to switch on at predetermined times (e.g., during expected actuation times of a seismic energy source, to conserve power and maintain synchronization of the sensor or node clock time relative to an absolute time reference (e.g., a GPS time signal).

Low energy, e.g., BLUETOOTH® wireless communication devices (Institute of Electrical and Electronics Engineers standard number 802.15.1) or similar radio devices, controlled by another circuit system may report node status, including battery life, completions of job, location over longer ranges than is capable by TransferJet communications devices, for example. BLUETOOTH is a registered trademark of Bluetooth Special Interest Group, Inc., Suite 350, 5209 Lake Washington Boulevard, Kirkland Wash. 98033.

The sensor node may comprise three external components, a bottom support capable of supporting the batteries and circuit boards; a top cap made of clear or translucent engineered plastic to enable visual observation of LED indicators; and a two-piece support ring that may include a hexagonal surface for removal from the ground and a smooth ring for charging. The top cap may include electrical contact pins for recharging batteries in the sensor node.

A wireless sensor node recharge cap may comprise electrical recharge leads that enable electrical contact with the sensor. One embodiment may include springs comprised of an electrically conductive metal that can make contact with the sensor regardless of orientation. The recharge circuit may be disposed in the sensor node and may controlled by suitable software programmed into the control unit 44.

The control unit 44 may comprise features to simultaneously recharge a plurality of sensors or sensor nodes, while permitting interrogation of data stored in the node The control unit 44 may comprise node battery recharge circuits.

Another embodiment having a continuous sensor or node "feed" mechanism is shown schematically in FIG. 4. The vehicle 30 may include a staging ram 43 that can extend through a storage chamber 45 having a plurality of stacked sensor or nodes 46. When the staging ram 43 is extended, it pushes the lowermost one of the sensor or nodes 46 into a curved track 41. An end of the track 41 may be disposed substantially coaxially below the bit or spike 14 disposed at the end of the ram 12. The chamber unit 16 in the present example embodiment may be affixed to the end of the track 41 such that when a sensor or node 46 is moved into the track by the staging ram 43, the sensor or node falls by gravity into the chamber unit 16 for eventual insertion into the hole by the ram 12 substantially as explained above. When the staging ram 43 is retracted, another sensor or node 46 may fall by gravity into a position in front of the staging ram 43. In this way, a plurality of sensors or nodes may be stored for individual deployment by the deployment apparatus.

Figure 6:
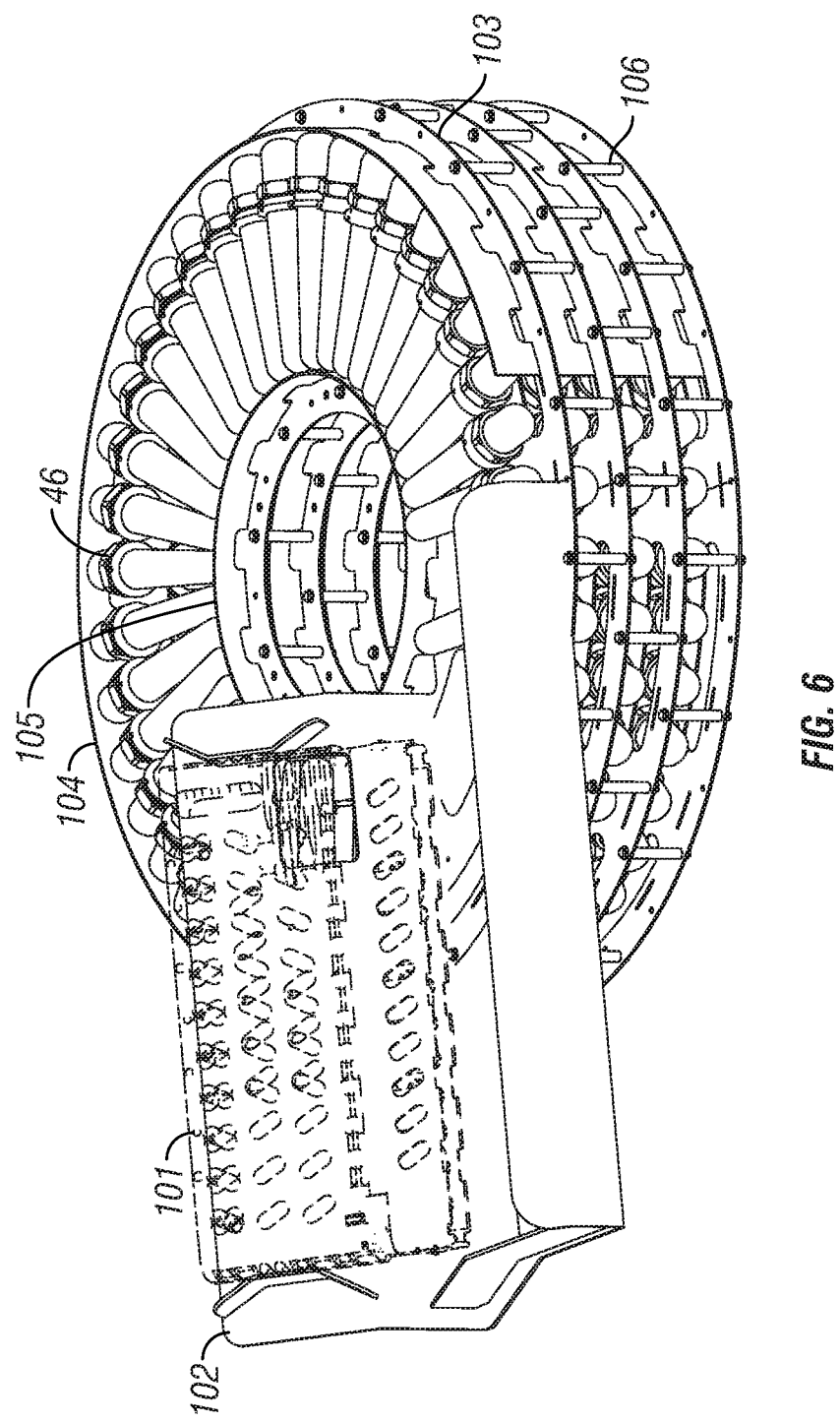
FIGS. 6 and 7 show another example embodiment of a node storage and feed mechanism.
Figure 7:
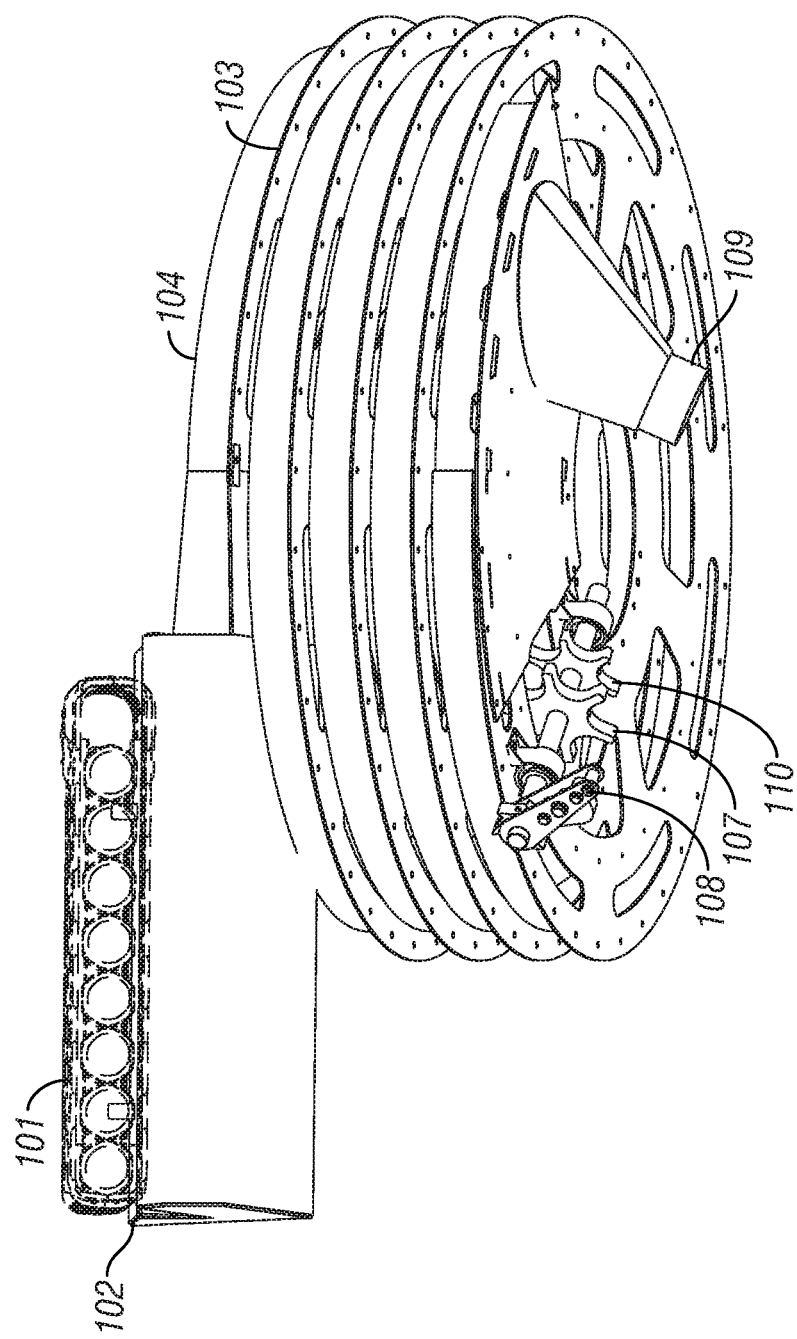

Another embodiment of a sensor node storage, delivery, and continuous feed mechanism for inserting sensors or sensor nodes into the ram 12 is shown in FIGS. 6 and 7. Pre-filled sensor or sensor node loading, charging and shipping crates 101 may be placed into a crate alignment and holding platform 102, wherein sensors or sensor nodes are released from the crate 101 and feed into a formed, helical carousel 103. The carousel 103 may be designed with the natural radius of curvature of the sensor or sensor node travel path such that an outer guide ring 104 and an inner guide ring 105 are concentric to the natural radius of curvature and do not impede, restrict, or interfere with the sensor or node travel path. The carousel 103 is formed as a helix, such that when a node or sensor 46 is placed onto the carousel 103, gravity combined with the controlled radius of curvature of the carousel 103 induce rotational motion of the sensor or sensor node 46, causing the sensor or node 46 to travel down the path until coming to stop on a deployment wheel 107. When the nodes or sensors 46 are collocated on the helical carousel 103, they are naturally constrained by adjacent nodes or sensors. Vibration of the sensor deployment unit during operation, vibrations due to vehicle (30 in FIG. 3) travel, gravity, and helix angle all induce motion into the node sensor 46, keeping the deployment wheel 107 charged. The angle of the helix (or pitch) can be changed and set by changing stand-offs 106 to increase the natural tendency of the node or sensor 46 to rotate and travel down the path. In the present example embodiment the sensors or sensor nodes 46 are enclosed and constrained by the carousel 103, and when considered with guide rings 104 and 105, prevent the dislocation of the sensor nodes 46 during operation and travel. The carousel 103 may be configured such that more helical plates are easily added to increase the overall storage capacity of the carousel 103. The node or sensor 46 stopped by engagement into the deployment wheel 107 will remain fixed until the sensor or node 46 is released. To release a node or sensor, a hydraulic, pneumatic, or electrical linear actuator is extended and pushes an actuating arm 108 which is mechanically attached to the deployment wheel 107 shaft through a ratcheting star wheel 110. The geometry of this system is such that full extension of the linear actuator causes the deployment wheel 107 to index just enough to release a node or sensor 46 yet prevent the next node or sensor on the carousel 103 from being released. The released node or sensor 46 travels through a natural arc of travel into a redirecting chute 109, ultimately guided into the chamber (16 in FIG. 4) by means of a guide chute or tube (41 in FIG. 4) where it can be deployed.

Once a deployment position has been selected, the vehicle positions the deployment apparatus (10 in FIG. 2) at the selected deployment geodetic location. If actuated by a human operator, the entire process described below may occur with a single activation of a control button and may proceed automatically according to an operating program used in the control unit (44 in FIG. 3). In some embodiments, the vehicle (30 in FIG. 3) may be automated and/or controlled remotely. At each selected geodetic location for a node or sensor, the ram (12 in FIG. 2) is actuated and the spike (14 in FIG. 2) presses a hole in the ground to a selected depth depending on the soil conditions. The next sensor or node to be ejected from the stack is released by a linear actuator pushing on the remaining sensors or nodes to open the ejector for dropping down the deployment chute. The deployment chute is terminated with a nodal positioning ring that serves to catch the dispensed sensor or node and center above the hole at selected height range. Once aligned above the hole, the sensor or node driver is controlled by a soft stop algorithm that positions the end of the driver post in contact with the top of the node. To press the sensor or node into the ground, while releasing it from the nodal positioning ring, the force exerted by the post driver may be automatically adjusted depending upon the firmness of the soil it is to be delivered. Automatic adjustment may be controlled by a linear position sensor coupled to the post driver, for example and without limitation a linear variable differential transformer in signal communication with a controller such as the control unit (44 in FIG. 2) programmed to operate the ram (12 in FIG. 2). If measurements by the linear position sensor indicate slowing movement of the post driver, the control unit (44 in FIG. 2) may increase the force applied by the post driver so resume movement of then sensor or node into the ground surface. A "soft stop" may be programmed into the control unit (44 in FIG. 2) to reduce the force applied by the ram (12 in FIG. 2) as the linear position sensor measures the position of the post driver reaching its deployment limit.

Once the insertion cycle has completed, the hole driver, nodal collar and chute are elevated to prevent damage once the vehicle moves to the next selected geodetic location for deployment.

At the end of the survey, sensor or node retrieval is required and may use a system on the vehicle 30 fitted with a tool that fits into the ring, or onto and under, the sensor or node coupled to, e.g., a hydraulic piston or other longitudinal movement mechanism. The control unit 44 activates nodes within a selected proximity, then may uses GPS or other geodetic signal positioning to locate the signals by waypoint determination. The vehicle 30 aligns the retrieval tool over the cap of the node, gripping and or prying the node up and out of the ground. Once the retrieval tool is secured to the sensor or node cap, the operator retrieves the sensor or node by actuating the device. The actuated arm is visually directed to align the compatible arm to insert a pair of prongs to gain leverage under the cap, followed by coupling the wrench to the node. The retrieval arm is capable of twisting and lifting to separate the node from the ground. Once lifted, the arm swings to position next to an open receiving crate. The arm shifts to the retrieval chute that pushes the node into position. This process is repeated until the crate is filled with nodes.

Some possible advantages of an automatic deployment apparatus and method according to the present disclosure may include one or more of the following.

The deployment apparatus mounting is flexible enough to mount onto the side of most any type of vehicle, for example, from small off-road utility vehicles or pickup trucks, or from the rear or through a "moon pool" opening in the floor of the cargo area of any such vehicle.

The deployment apparatus may be powered hydraulically (either from a dedicated power unit or connection to a vehicle hydraulic power takeout, for vehicles where available and with sufficient pressure and flow.

The deployment apparatus may be powered electro-mechanically, or purely mechanically with a small engine or by electric motors.

The deployment apparatus, if using an hydraulically ram may be assembled with or without pressure reservoirs (i.e., accumulator(s)) to speed up the hydraulic ram operation.

The deployment apparatus may have computerized control of the orientation of the ram and chamber unit to enable creation of deployment holes in any selected orientation, e.g., vertical, irrespective of the attitude of the ground surface where the vehicle is located.

The deployment apparatus may be mounted on a frame that affixes to the vehicle, with powered slides, such that the deployment apparatus may be raised for traveling and lowered for node deployment operation.

The deployment apparatus may have a control mechanism capable of operating the vehicle's brakes to lock when beginning hole punching and sensor or node deployment at any particular location.

The deployment apparatus power supply may be able to provide ram pressing action that can also contain vibrations, rotation, or high impacts, as well as directly pressing the spike or bit into the ground surface.

The deployment apparatus may be able to automatically move sensors or nodes from a mass storage "bin" or "hopper" (see FIG. 4) or other type of storage to the chamber unit assembly for deployment.

A sensor or node may be selected from the storage bin loaded into the chamber unit and then pressed into the hole created by the bit or spike immediately after it is withdrawn therefrom, and without moving the deployment apparatus. The sensor or node will then be urged into the hole by the ram.

The sensor or node may be configured to provide communications between the node being deployed and a computerized test and guidance unit in the vehicle.

The deployment apparatus may be provided with a computer or other processor that is programmed to provide satellite and or other precision positioning and vehicle guidance to predetermined deployment geodetic locations.

The deployment apparatus and its controls may be fitted and programmed so to operate fully autonomously on a sensor or sensor node deployment program, with safety sensors and control.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A geophysical sensor deployment apparatus, comprising:
   a ram extensible through a ram guide, the ram guide having an opening for insertion of a geophysical sensor, the ram having a ground displacing bit at a movable end thereof, the ground displacing bit comprising a same, non-zero exterior taper angle as an exterior taper angle of a ground contact portion of the geophysical sensor, the bit having dimensions smaller than the ground contact portion at corresponding longitudinal positions along each of the ground contact portion and the bit, the ground displacing bit having a substantially round and smooth exterior surface; and
   wherein the ram and the guide are mounted to a frame, the mounting having a pivot and a plurality of angularly separated extension mechanisms disposed between the ram and ram guide and the frame whereby an elevation and an orientation of the ram and the ram guide are controllable by selective extension of each of the plurality of extension mechanisms.

2. The apparatus of claim 1 wherein the ground displacing bit is configured to rotate when the ram is extended or retracted.

3. The apparatus of claim 1 further comprising a tilt sensor in signal communication with a processor, the processor configured to transmit control signals to each of the extension mechanisms to cause a measured tilt to correspond to a predetermined orientation of the ram and guide.

4. The apparatus of claim 3 further comprising a geodetic position signal receiver in signal communication with the processor, whereby a geodetic position of operation of the ram for deployment of a geophysical sensor is determinable.

5. The apparatus of claim 4 further comprising instructions programmed into the processor to automatically operate the ram at predetermined geodetic positions.

6. The apparatus of claim 1 further comprising a vehicle to which the frame is mounted.

7. The apparatus of claim 6 further comprising a control unit having instructions programmed thereon to operate the vehicle to automatically move to each of a plurality of selected geodetic positions, stop at each of the plurality of selected geodetic positions and operate the ram at each of plurality of selected geodetic positions.

8. The apparatus of claim 1 wherein the ram and the plurality of extension mechanisms comprise hydraulic cylinders and rams.

9. The apparatus of claim 1 further comprising a storage chamber for storing a plurality of sensors or sensor nodes, a staging ram disposed to one side of the storage chamber and a track disposed proximate the storage chamber and shaped to discharge a sensor or sensor node into the ram guide when the staging ram is extended through an opening in the storage chamber.

10. The apparatus of claim 9 wherein the storage chamber comprises a helical carousel.

11. The apparatus of claim 1 wherein the ram comprises a power control device operably coupled thereto, the power control device operable to cause the ram to exert more force when urging the ground penetrating bit into surface soil to create a hole than a force exerted by the ram when displacing a sensor or sensor node into the created hole.

* * * * *